United States Patent
Kügel et al.

(10) Patent No.: US 12,496,225 B2
(45) Date of Patent: Dec. 16, 2025

(54) CORNEAL REFRACTIVE CORRECTION USING A SURFACE TREATMENT AFTER CORNEAL RESHAPING

(71) Applicant: TECHNOLAS PERFECT VISION GMBH, Munich (DE)

(72) Inventors: Wolfgang Kügel, Karlsfeld (DE); Christof Donitzky, Eckental (DE)

(73) Assignee: TECHNOLAS PERFECT VISION GMBH, Munich (DE)

( * ) Notice: Subject to any disclaimer, the term of this patent is extended or adjusted under 35 U.S.C. 154(b) by 377 days.

(21) Appl. No.: 17/559,947

(22) Filed: Dec. 22, 2021

(65) Prior Publication Data
US 2022/0110792 A1 Apr. 14, 2022

Related U.S. Application Data

(63) Continuation of application No. PCT/EP2020/068697, filed on Jul. 2, 2020.

(30) Foreign Application Priority Data

Jul. 2, 2019 (EP) ..................................... 19183951
Jul. 2, 2020 (WO) ................. PCT/EP2020/068697

(51) Int. Cl.
*A61F 9/008* (2006.01)

(52) U.S. Cl.
CPC .................... *A61F 9/00802* (2013.01); *A61F 2009/00872* (2013.01)

(58) Field of Classification Search
CPC .............. A61F 9/00802; A61F 9/00804; A61F 9/00814; A61F 9/00836
(Continued)

(56) References Cited

U.S. PATENT DOCUMENTS 4,988,348 A    1/1991  Bille
5,980,513 A *  11/1999 Frey ........................ A61F 9/008
                                                            351/212
(Continued)

FOREIGN PATENT DOCUMENTS

WO    WO-2016/207739 A1    12/2016

OTHER PUBLICATIONS

R. Maini: "A comparison of different depth ablations in the treatment of painful bullous keratopathy with phototherapeutic keratectomy", British Journal of Ophthalmology, vol. 85, No. 8, Aug. 1, 2001 (Aug. 1, 2001), pp. 912-915.
(Continued)

*Primary Examiner* — Ahmed M Farah
(74) *Attorney, Agent, or Firm* — Harness, Dickey & Pierce, P.L.C.

(57) ABSTRACT

The present disclosure relates to a system for treating a cornea of a human eye using laser radiation. The system includes a laser system and a control system, which is configured to control the laser system for performing (a) a reshaping laser ablation for ablating a portion of a stroma of the cornea; and (b) a laser surface treatment. The laser surface treatment is a substantially optically non-corrective treatment of a reshaped surface portion. The reshaped surface portion represents a corrective or non-corrective reshaping of an anterior surface of the cornea and is formed using the reshaping laser ablation. A maximum ablation depth of the laser surface treatment is less than 5 micrometers or less than 3 micrometers.

20 Claims, 10 Drawing Sheets

(58) Field of Classification Search
USPC .......................................................... 606/3, 5
See application file for complete search history.

(56) References Cited

U.S. PATENT DOCUMENTS

| | | |
|---|---|---|
| 6,220,247 B1 | 4/2001 | Maldonado Bas |
| 2007/0173797 A1* | 7/2007 | Zickler ............... A61F 9/00804 |
| | | 606/10 |
| 2010/0114077 A1* | 5/2010 | Dai ..................... A61F 9/00806 |
| | | 606/5 |
| 2010/0241108 A1 | 9/2010 | Wullner et al. |
| 2012/0078240 A1* | 3/2012 | Spooner ............. A61F 9/00827 |
| | | 606/17 |
| 2022/0211543 A1* | 7/2022 | Mikula ................ A61F 9/0084 |

OTHER PUBLICATIONS

International Search Report from corresponding PCT Application No. PCT/EP2020/068697 (6 pages).
Written Opinion of the International Searching Authority from corresponding PCT Application No. PCT/EP2020/068697 (7 pages).
S. Horgan et al.: "Phototherapeutic Smoothing as an Adjunct to Photorefractive Keratectomy in Porcine Corneas", Journal of Refractive Surgery, vol. 15, May/Jun. 1999, p. 331-333.
P. Vinciguerra et al.: "Effect of Decreasing Surface and Interface Irregularities after Photorefractive Keratectomy and Laser in situ Keratomileusis on Optical and Functional Outcomes", Journal of Refractive Surgery, vol. 14, No. 2 (suppl), Apr. 1998, p. S199-S203.

\* cited by examiner

CORNEAL REFRACTIVE CORRECTION USING A SURFACE TREATMENT AFTER CORNEAL RESHAPING

FIELD

The present invention relates to a system and a method for laser ablation treatment of the eye. Specifically, the present invention relates to a system and a method for applying laser light to an exposed stroma surface. A non-corrective laser surface treatment is performed after reshaping the corneal stroma for removing a pseudomembrane, which has been formed as a result of the reshaping process.

BACKGROUND

Various surgical procedures have been developed for correcting visual deficiencies or to treat corneal surface disease (such as scars), by reshaping the cornea using a laser. These surgical procedures include ablation based treatments such as photorefractive keratectomy (PRK), laser assisted subepithelial keratomileusis (LASEK), laser-assisted in-situ keratomileusis (LASIK) and phototherapeutic keratectomy (PTK) as well as femtosecond laser based procedures such as femtosecond lenticule extraction (FLEx) and small incision lenticule extraction (SMILE).

In each of these procedures, the laser beam is used to remove a predetermined amount of the corneal stroma which is located beneath the corneal epithelium and Bowman's membrane to form a reshaped surface portion. PRK, LASEK, LASIK and PTK differ in terms of how the epithelium is treated to gain access to the stromal tissue. While in LASEK procedures, a flap of epithelium is mechanically pushed back so that it can be later placed into its original position, in PRK and PTK procedures, a portion of the epithelium is removed entirely. LASIK differs from LASEK in that the LASEK procedure only utilizes the epithelial tissue for forming the flap, whereas in LASIK, a thicker flap of corneal tissue, is cut with a microkeratome blade or a femtosecond laser. A femtosecond laser can also be used to directly cut the desired shape which can then be removed mechanically as it is done e.g. for FLEx and SMILE.

It has been shown, however, that each of these treatment procedures has post-treatment risks of poor wound healing. By way of example, it is known that these treatment procedures may lead to corneal haze, which is a side-effect in which the cornea develops opaque white cells which cloud the vision to some extent. Corneal haze may cause glare from bright lights and a vague fogginess of vision. Furthermore, there are reports of people suffering recurrent corneal erosions (RCE) after treatment.

Accordingly, a need exists to provide devices and methods for corneal laser ablation treatment, which reduce post-treatment risks.

SUMMARY

Embodiments of the present disclosure pertain to a system for treating a cornea of a human eye using laser radiation. The system comprises a laser system; and a control system, which is configured to control the laser system for performing (a) a reshaping laser ablation for ablating a portion of a stroma of the cornea; and (b) a laser surface treatment. The laser surface treatment is an optically non-corrective or substantially optically non-corrective treatment of a reshaped surface portion. The reshaped surface portion represents a corrective or non-corrective reshaping of an exposed surface of the stroma. The reshaped surface portion is formed using the reshaping laser ablation. A maximum ablation depth of the laser surface treatment is less than 5 micrometers or less than 3 micrometers. The reshaping laser ablation and the laser surface treatment may be separated by a separation time interval during which no or substantially no ablation of the reshaped surface portion occurs. The laser system may be configured to generate a pulsed laser beam at least during the reshaping laser ablation. A repetition rate of the pulsed laser beam during the reshaping laser ablation may be at least 100 Hz, or at least 200 Hz and the separation time interval may be at least 0.1 seconds or at least 0.2 seconds.

The laser system may include an excimer laser. The laser system may be configured to generate a laser beam, which is focused on the anterior surface of the eye. The reshaping laser ablation and the laser surface treatment may be performed at different pulse repetition rates.

The laser system may include a scanning system for scanning the laser beam across an anterior surface portion of the cornea. The scanning system may be configured to move a beam axis of the laser beam in an irregular pattern over the reshaped surface portion.

The system may include an eye-tracking system for detecting eye movement and automatically delivering the laser beam to determined positions on the eye's anterior surface.

The laser system may include a beam homogenizer for generating a homogenized beam profile on the anterior surface of the cornea.

The control system may include a computer system having a processor and a memory for storing instructions processable by the processor. The processor may execute an operating system. The data analysis system may further include a user interface, which is configured to allow a user to receive data from the data processing system and/or to provide data to the data processing system. The user interface may include a graphical user interface.

The reshaping laser ablation may be performed on the exposed stroma surface of the cornea. The exposed stroma surface may be formed using the system. The reshaping laser ablation may ablate an anterior portion of the stromal tissue at the exposed surface of the stroma. Additionally, the reshaping laser ablation may ablate at least a portion of the epithelial and the Bowman's membrane.

The reshaped surface portion represents a corrective or non-corrective reshaping of an exposed surface of the stroma. A transition zone, which represents a transition between the reshaped surface portion and an untreated portion of the cornea may be generated using the reshaping laser ablation. The transition zone may surround the reshaped surface portion. The laser surface treatment may be configured to treat at least a portion of the transition zone or may be configured to leave the transition zone untreated.

The reshaped surface portion may be disc-shaped or substantially disc-shaped. The reshaped surface portion may be centered about a line of sight of the eye. The reshaped surface portion may represent or cover an optical zone. The optical zone may represent a portion of the cornea, that overlies more than 50% of the area of the dilated pupil. A diameter of the reshaped surface portion and/or the optical zone may be greater than 4 millimeters or greater than 5 millimeters. The diameter may be less than 10 millimeters or less than 8 millimeters.

One or more size parameters of the optical zone, such as a diameter of the optical zone, may be stored by the control system in a data storage of the control system. The one or more size parameters may be determined or received by the control system, such as via a user interface or from another system, which is in signal communication with the control system. The control system may be configured to perform the reshaping laser ablation and/or the laser surface treatment based on the one or more size parameters.

The reshaping laser ablation and/or the laser surface treatment may be dominated by ablative photodecomposition of corneal tissue.

A wavelength of a laser beam used for the reshaping laser ablation and/or the laser surface treatment may be greater than 150 nm or greater than 190 nm. The wavelength may be less than 400 nm or less than 200 nm.

The term "ablation depth" may be defined herein to mean the depth of the portion of stromal tissue, which is ablated using the laser surface treatment. The depth may be measured in a direction parallel to the visual axis of the eye. Different locations on the exposed stroma surface may be treated with different ablation depths. The maximum laser ablation depth that may be the defined herein to mean a maximum value of all ablation depths on the reshaped surface portion.

According to an embodiment, the separation time interval is at least 0.5 seconds, or at least 1 second or at least 1.5 seconds. The separation interval may be less than 20 seconds or less than 10 seconds or less than 5 seconds.

The separation time interval may be preset in the control system and/or predetermined by the control system. The preset separation time interval may be settable by the user. The separation time interval may be stored in a data storage device of the control system. The control system may be configured to measure the separation time interval so that the laser surface treatment is not started until the separation time interval has lapsed.

According to an embodiment, the maximum ablation depth of the laser surface treatment is less than 1.5 micrometers or less than 1 micrometer.

According to an embodiment, for each or substantially each point on the reshaped surface portion, the ablation depth of the laser surface treatment is at least 0.1 micrometers or at least 0.2 micrometers or at least 0.5 micrometers.

According to a further embodiment, at least at one position on the reshaped surface, a stromal ablation depth of the reshaping laser ablation is greater than 5 micrometers, or greater than 7 micrometers, or greater than 10 micrometers. A maximum ablation depth of the reshaping laser ablation may be less than 300 micrometers or less than 200 micrometers.

The ablation depth of the laser surface treatment may be constant or substantially constant over the reshaped surface portion. The control system may be configured to at least partially compensate for different ablation depths caused by different angles of incidence of the laser beam depending on the location on the reshaped surface. This allows removing only the amount of tissue, which is necessary to remove the pseudomembrane, which has a comparatively constant thickness. Further, since compensation for different angles of incidence prevents unnecessary ablation of corneal tissue, it also facilitates keeping the surface temperature during the surface layer treatment low.

However, sufficiently satisfactory clinical results can be obtained if the laser surface treatment does not compensate for different angles of incidence. A variation of the ablation depth of the laser surface treatment over the reshaped surface portion may be less than 30% or less than 20% of a maximum ablation depth of the laser surface treatment within the reshaped surface portion. The ablation depth of the laser surface treatment may be sufficient to ablate a pseudomembrane, which is present on the stroma at the start of the laser surface treatment. The pseudomembrane may be at least partially caused by the reshaping laser ablation. Specifically, the pseudomembrane may be caused at least partially by an increased surface temperature during the reshaping laser ablation.

According to a further embodiment, the control system is configured to determine the separation time interval based on one or more parameters of the reshaping laser ablation and/or a based on a class associated with the reshaping laser ablation. The class may be a class of refractive corrections. The class may be assigned to the reshaping laser ablation by the control system. Alternatively, the class may be assigned to the reshaping laser ablation by a system, which is external to the system for treating the cornea. The external system may be in signal communication with the control system. The one or more parameters of the reshaping laser ablation may be received or determined by the control system.

According to an embodiment, the control system includes a user interface which is configured to receive user input, which comprises treatment input for performing the reshaping laser ablation and treatment input for performing the laser surface treatment. The control system may be configured to control, after receiving the user input and based on the user input, the laser system for performing the reshaping laser ablation and the laser surface treatment.

According to a further aspect, the present disclosure pertains to a system for treating a cornea of a human eye using laser radiation. The system includes a laser system and a control system, which is configured to control the laser system for performing (a) a reshaping laser ablation for ablating a portion of a stroma of the cornea; and (b) a laser surface treatment. The laser surface treatment is an optically non-corrective or substantially optically non-corrective treatment of a reshaped surface portion. The reshaped surface portion represents a corrective or non-corrective reshaping of an exposed surface of the stroma. The reshaped surface portion is formed using the reshaping laser ablation. The control system includes a user interface which is configured to receive user input, which comprises treatment input for performing the reshaping laser ablation and treatment input for performing the laser surface treatment. The control system is configured to control, after receiving the user input and based on the user input, the laser system for performing the reshaping laser ablation and the laser surface treatment.

The laser system may be configured to generate a pulsed laser beam for performing the reshaping laser ablation and/or the laser surface treatment. A pulse repetition rate of the pulsed laser beam during the reshaping laser ablation and/or during the laser surface treatment may be greater than 10 Hz, or greater than 100 Hz or greater than 300 Hz, or greater than 400 Hz. The pulse repetition rate during the reshaping laser ablation and/or during the laser surface treatment may be less than 2000 Hz or less than 1000 Hz, or less than 500 Hz. By way of example, the pulse repetition rate is 500 Hz.

The user interface may include a graphical user interface. The user interface may be configured to receive the user input via one or more input devices, such as a touch-sensitive display screen, a control lever and/or a foot pedal. The user interface may be configured to display to the operator information via an output device, such as a display device. The treatment input for performing the reshaping laser ablation and/or the treatment input for performing the laser surface treatment may include a command for activating or deactivating the respective process. Additionally or alternatively, the treatment input may include one or more parameters values for controlling the respective process.

Examples for treatment input for the reshaping laser ablation are, but are not limited to: a target spherical power (measured in units of reciprocal focal length), an extent, in particular a diameter, of an optical zone (measured in units of length, such as millimeters), a spherical correction and/or an astigmatic correction (measured in units of reciprocal focal length); and/or an orientation of the axis of the astigmatic correction (measured in units of radians or degrees).

Examples for treatment input for the laser surface treatment are, but are not limited to: an ablation depth (measured in units of length, such as micrometers) and an on/off command for activating or deactivating the laser surface treatment. If the laser surface treatment is deactivated, the reshaping treatment is carried out without the laser surface treatment. Additionally or alternatively, the treatment input may include input for compensating for different angles of incidence of the laser beam on the exposed stroma surface. The input for the compensation may include a command for activating or deactivating the compensation.

According to a further embodiment, the control system is configured to receive, at least after completion of the reshaping laser ablation, start command user input for starting the laser surface treatment. The control system may be configured not to start the laser surface treatment until the start command user input is received and until the separation time interval has lapsed. The start command user input may be received via an input device of the control system. By way of example, the input device includes a foot pedal.

According to a further embodiment, the control system is configured to receive or generate data which are indicative of one or more parameters of a refractive vision correction of the eye. The reshaping laser ablation may be configured so that the reshaped surface portion represents or substantially represents the refractive vision correction. The data may be received from the user or from an external system, which is separate from the system for treating the cornea. The external system may be in signal communication with the control system.

Examples for refractive vision corrections are but are not limited to: spherical corrections, astigmatic corrections, higher order corrections and combinations thereof.

Examples for parameters of the refractive vision correction are, but are not limited to: a spherical correction (measured in units of reciprocal focal length), an astigmatic correction (measured in units of reciprocal focal length), an axis of the astigmatic correction (measured in units of radians or degrees) and one or more parameters of a correction of higher order optical aberrations (i.e. aberrations that go beyond myopia, hyperopia and astigmatism).

According to a further embodiment, the laser surface treatment is performed so that each or substantially each point on the reshaped surface portion is treated by at most 10 pulses, or at most 5 pulses, or at most 3 pulses, or at most 2 pulses of the pulsed laser beam.

According to a further embodiment, during the laser surface treatment, a pulse fluence of the pulsed laser beam is greater than 30 mJ/cm$^2$ or greater than 40 mJ/cm$^2$ or greater than 100 mJ/cm$^2$, or greater than 150 mJ/cm$^2$, or greater than 180 mJ/cm$^2$. The pulse fluence may be less than 400 mJ/cm$^2$, or less than 300 mJ/cm$^2$.

According to a further embodiment, the laser surface treatment is performed so that each pair or substantially each pair of time-consecutive laser pulses of the pulsed laser beam, which are applied to the reshaped surface portion for performing the laser surface treatment, are spatially non-overlapping or substantially spatially non-overlapping. The spatial overlap may be measured on the surface of the exposed stroma. For each of the pulses, a spatial extent of the respective pulse may be defined by a boundary representing one-half of the maximum intensity of the respective pulse.

According to a further embodiment, each or substantially each group of 3 time-consecutive pulses of the pulsed laser beam, which are applied to the reshaped surface portion for performing the laser surface treatment, are spatially non-overlapping or substantially spatially non-overlapping. In other words, each pair of the group of pulses is spatially non-overlapping or substantially spatially non-overlapping.

According to a further embodiment, each or substantially each group of 4 time-consecutive pulses of the pulsed laser beam, which are applied to the reshaped surface portion for performing the laser surface treatment, are spatially non-overlapping or substantially spatially non-overlapping. The required number of non-overlapping or substantially non-overlapping pulses in a group may be even 5, 6, 8, 10, 12, 16 or 20.

According to a further embodiment, a diameter of a laser spot, which is formed by a laser beam, which is generated by the laser system on the reshaped surface portion for performing the laser surface treatment, is greater than 0.5 millimeters or greater than 0.7 millimeters. According to a further embodiment, the diameter is greater than 1.5 millimeters, or greater than 2 millimeters, or greater than 3 millimeters. The diameter of the laser spot may be less than 10 millimeters or less than 8 millimeters. The diameter may be defined as the full width of the beam at half of its maximum intensity (FWHM). The diameter of the laser spot during the laser surface treatment may be different, in particular greater, than a diameter of the laser spot during the reshaping laser ablation.

According to a further embodiment, a pulse repetition rate of the pulsed laser beam during the laser surface treatment is less than a pulse repetition rate during the reshaping laser ablation. The pulse repetition rate during the laser surface treatment may be less than 90% or less than 80% of the pulse repetition rate during the reshaping laser ablation. The pulse repetition rate during the laser surface treatment may be at least 1% or at least 10% of the pulse repetition rate during the reshaping laser ablation.

According to a further embodiment, a pulse energy of the pulsed laser beam during the laser surface treatment is less than a pulse energy during the reshaping laser ablation. The pulse energy during the laser surface treatment may be less than 90% or less than 80% of the pulse energy during the reshaping laser ablation. The pulse energy during the laser surface treatment may be at least 10% of the pulse energy during the reshaping laser ablation. The system may be configured to adapt the pulse energy by changing the pulse duration and/or the peak power of the laser pulses.

According to an embodiment, a pulse duration of the pulsed laser beam during the laser surface treatment is less than a pulse duration during the reshaping laser ablation. The pulse duration during the laser surface treatment may be less than 90% or less than 80% of the pulse duration during the reshaping laser ablation. The pulse duration during the laser surface treatment may be at least 10% of the pulse duration during the reshaping laser ablation. The pulse duration may be measured at one-half of the peak power.

According to a further embodiment, a pulse peak power of the pulsed laser beam during the laser surface treatment is less than a pulse peak power during the reshaping laser ablation. The pulse peak power during the laser surface treatment may be less than 90% or less than 80% of the pulse peak power during the reshaping laser ablation. The pulse peak power during the laser surface treatment may be at least 10% of the pulse peak power during the reshaping laser ablation.

The laser system may include two laser sources. A first one of the laser sources may be operated to generate the laser beam during the reshaping laser ablation and the second one of the laser sources may be operated to generate the laser beam during the laser surface treatment. Each of the laser sources may have a separate laser cavity.

According to a further embodiment, the control system is configured to determine one or more parameters of the laser surface treatment based on one or more parameters of the reshaping laser ablation and/or one or more parameters of the reshaped surface portion. The control system may be configured to receive or determine the one more parameters of the reshaping laser ablation and/or the one or more parameters of the reshaped surface portion.

The one or more parameters of the reshaping laser ablation and/or the one or more parameters of the reshaped surface portion may be a measure for a thickness of the pseudomembrane. The control system may be configured to determine an estimate for a thickness of the pseudomembrane based on the one or more parameters of the reshaping laser ablation and/or the one or more parameters of the reshaped surface portion. Based on the determined thickness, the control system may determine the one or more parameters of the laser surface treatment.

The determination of the one or more parameters of the laser surface treatment may be performed using a lookup table. The lookup table may be stored in a data storage device of the control system. The lookup table may assign parameters of the reshaping laser ablation and/or parameters of the reshaped surface portion to parameters of the laser surface treatment.

Examples for the one or more parameters of the reshaping laser ablation are but are not limited to: a parameter of a laser beam applied during the reshaping laser ablation, a parameter of a scanning pattern used during the reshaping laser ablation and an ablation depth, in particular a maximum ablation depth of the reshaping laser ablation. The parameter of the laser beam may be a parameter of a pulse energy of the laser beam during the reshaping laser ablation (such as a pulse peak power or a pulse duration), or a pulse repetition rate of the pulsed laser beam during the reshaping laser ablation. The parameter of a scanning pattern may be a number of laser pulses applied to a location on the exposed surface of the stroma.

Examples for the one or more parameters of the reshaped surface portion are but are not limited to: a spherical correction (measured in units of reciprocal focal length) and/or an astigmatic correction (measured in units of reciprocal focal length).

Examples for the one or more parameters of the laser surface treatment are but are not limited to: a parameter of a laser beam applied during the laser surface treatment, a parameter of a scanning pattern used during the laser surface treatment and an ablation depth, in particular a maximum ablation depth of the laser surface treatment. The parameter of the laser beam may be a parameter of a pulse energy of the laser beam during the laser surface treatment (such as a pulse peak power or a pulse duration), or a pulse repetition rate of the pulsed laser beam during the laser surface treatment. The parameter of a scanning pattern may be a number of laser pulses applied to a location on the reshaped surface portion.

According to a further aspect, the present disclosure pertains to a method for treating a cornea of a human eye using a system, which includes a laser system configured to generate a pulsed laser beam. The method comprises: performing a reshaping laser ablation for ablating a portion of a stroma of the cornea. The method further comprises performing a laser surface treatment, wherein the laser surface treatment is an optically non-corrective or a substantially optically non-corrective treatment of a reshaped surface portion. The reshaped surface portion represents a corrective or non-corrective reshaping of an exposed surface of the stroma. The reshaped surface portion is formed using the reshaping laser ablation. A maximum ablation depth of the laser surface treatment is less than 5 micrometers or less than 3 micrometers. The reshaping laser ablation and the laser surface treatment are separated by a separation time interval during which no or substantially no ablation of the reshaped surface portion occurs. A repetition rate of the pulsed laser beam during the reshaping laser ablation is at least 100 Hz, or at least 200 Hz, and the separation time interval is at least 0.1 seconds or at least 0.2 seconds.

According to a further embodiment, a maximum surface temperature on the exposed surface of the stroma during the laser surface treatment is lower than a maximum surface temperature during the reshaping laser ablation. The maximum surface temperature may be a maximum temperature of all local temperatures on the corneal surface and all temperatures, which occur during a treatment time of the reshaping laser ablation and the laser surface treatment, respectively.

The present disclosure relates to, at least, the following embodiments:

Item 1: A system for treating a cornea of a human eye using laser radiation, the system comprising: a laser system; and a control system, which is configured to control the laser system for performing: (a) a reshaping laser ablation for ablating a portion of a stroma of the cornea; and (b) a laser surface treatment; wherein the laser surface treatment is a substantially optically non-corrective treatment of a reshaped surface portion, wherein the reshaped surface portion represents a corrective or non-corrective reshaping of an exposed surface of the stroma and is formed using the reshaping laser ablation; wherein a maximum ablation depth of the laser surface treatment is less than 5 micrometers or less than 3 micrometers.

Item 2: The system of item 1, wherein the control system is configured so that the reshaping laser ablation and the laser surface treatment are separated by at least a separation time interval during which no or substantially no ablation of the reshaped surface portion occurs.

Item 3: The system of item 2, wherein the separation time interval is at least 0.1 seconds or at least 0.2 seconds, or at least 0.5 seconds, or at least 1 second.

Item 4: The system of item 3, wherein the reshaping laser ablation is performed using a pulsed laser beam generated by the laser system; and a repetition rate of the pulsed laser beam during the reshaping laser ablation is at least 100 Hz, or at least 200 Hz.

Item 5: The system of items 2 to 4, wherein the control system is configured to determine the separation time interval based on one or more parameters of the reshaping laser ablation and/or based on a class associated with the reshaping laser ablation.

Item 6: The system of any one of items 2 to 5, wherein the control system is configured to receive, at least after completion of the reshaping laser ablation, start command user input for starting the laser surface treatment; wherein the control system is configured not to start the laser surface treatment until the start command user input is received and until the separation time interval has lapsed.

Item 7: The system according to any one of the preceding items, wherein the control system comprises a user interface which is configured to receive user input, which comprises treatment input for performing the reshaping laser ablation and treatment input for performing the laser surface treatment; wherein the control system is configured to control, after receiving the user input and based on the user input, the laser system for performing the reshaping laser ablation and the laser surface treatment.

Item 8: The system of item 7, wherein the treatment input for performing the laser surface treatment comprises a value of an ablation depth of the laser surface treatment.

Item 9: The system of items 7 or 8, wherein the treatment input for performing the laser surface treatment comprises a command for activating or deactivating the laser surface treatment.

Item 10: The system of any one of the preceding items, wherein the maximum ablation depth of the laser surface treatment is less than 1.5 micrometers or less than 1 micrometer.

Item 11: The system of any one of the preceding items, wherein: the laser surface treatment is performed using a pulsed laser beam generated by the laser system; and the laser surface treatment is performed so that substantially each point on the reshaped surface portion is treated by at most 10 pulses, or at most 5 pulses, or at most 3 pulses, or at most 2 pulses of the laser beam.

Item 12: The system of any one of the preceding items, wherein a pulse repetition rate of a pulsed laser beam which is generated by the laser system and used for performing the reshaping laser ablation is greater than 10 Hz, or greater than 100 Hz or greater than 300 Hz, or greater than 400 Hz; and/or wherein a pulse repetition rate of a pulsed laser beam which is generated by the laser system and used for performing the laser surface treatment is greater than 10 Hz, or greater than 100 Hz or greater than 300 Hz, or greater than 400 Hz.

Item 13: The system of any one of the preceding items, wherein: the laser surface treatment is performed using a pulsed laser beam generated by the laser system; and the laser surface treatment is performed so that substantially each pair of time-consecutive laser pulses of the laser beam, which are applied to the reshaped surface portion, are substantially spatially non-overlapping.

Item 14: The system of any one of the preceding items, wherein: the laser surface treatment is performed using a pulsed laser beam generated by the laser system; and substantially each group of 3 time-consecutive pulses of the pulsed laser beam, which are applied to the reshaped surface portion for performing the laser surface treatment, are substantially spatially non-overlapping.

Item 15: The system of any one of the preceding items, wherein: the laser surface treatment is performed using a pulsed laser beam generated by the laser system; and substantially each group of 4 time-consecutive pulses of the pulsed laser beam, which are applied to the reshaped surface portion for performing the laser surface treatment, are substantially spatially non-overlapping.

Item 16: The system of any one of the preceding items, wherein for substantially each point on the reshaped surface portion, the ablation depth of the laser surface treatment is at least 0.05 micrometers, or at least 0.1 micrometers or at least 0.2 micrometers or at least 0.5 micrometers.

Item 17: The system according to any one of the preceding items, wherein at least at one position on the reshaped surface, a stromal ablation depth of the reshaping laser ablation is greater than 5 micrometers or greater than 10 micrometers.

Item 18: The system of any one of the preceding items, wherein the reshaped surface portion represents the corrective reshaping of the exposed surface of the stroma, wherein the control system is configured to: receive or generate data which are indicative of one or more parameters of a refractive vision correction of the eye; wherein the reshaping laser ablation is configured so that the reshaped surface portion substantially represents the refractive vision correction.

Item 19: The system according to any one of the preceding items, wherein a pulse repetition rate of a pulsed laser beam generated by the laser system during the laser surface treatment is less than a pulse repetition rate of a pulsed laser beam generated by the laser system during the reshaping laser ablation.

Item 20: The system according to any one of the preceding items, wherein a pulse duration of a pulsed laser beam generated by the laser system during the laser surface treatment is less than a pulse duration of a pulsed laser beam generated by the laser system during the reshaping laser ablation.

Item 21: The system according to any one of the preceding items, wherein a pulse peak power of a pulsed laser beam generated by the laser system during the laser surface treatment is less than a pulse peak power of a pulsed laser beam generated by the laser system during the reshaping laser ablation.

Item 22: The system of any one of the preceding items, wherein a maximum surface temperature on the anterior surface during the laser surface treatment is lower than a maximum surface temperature on the anterior surface during the reshaping laser ablation.

Item 23: The system of any one of the preceding items, wherein the control system is configured to determine one or more parameters of the laser surface treatment based on one or more parameters of the reshaping laser ablation and/or one or more parameters of the reshaped surface portion.

Item 24: A method for treating a cornea of a human eye using a system, which includes a laser system, the method comprising: performing a reshaping laser ablation for ablating a portion of a stroma of the cornea; performing a laser surface treatment, wherein the laser surface treatment is a substantially optically non-corrective treatment of a reshaped surface portion; wherein the reshaped surface portion represents a corrective or non-corrective reshaping of an exposed surface of the stroma and is formed using the reshaping laser ablation; wherein a maximum ablation depth of the laser surface treatment is less than 5 micrometers or less than 3 micrometers.

Item 25: The method of item 24, further comprising: receiving, via a user interface of a control system, user input, which comprises treatment input for performing the reshaping laser ablation and treatment input for performing the laser surface treatment; and controlling, using the control system, after receiving the user input and based on the user input, the laser system for performing the reshaping laser ablation and the laser surface treatment.

Item 26: The method of items 24 or 25, wherein the laser surface treatment is performed using a pulsed laser beam generated by the laser system; and wherein the performing of the laser surface treatment comprises: scanning the pulsed laser beam across the reshaped surface portion so that substantially each point on the reshaped surface portion is treated by at most 10 pulses or at most 5 pulses, or at most 3 pulses, or at most 2 pulses of the laser beam.

Item 27: The method of any one of items 24 to 26, wherein the reshaped surface portion represents the corrective reshaping of the exposed surface of the stroma, and the system further comprises: receiving or generating data which are indicative of one or more parameters of a refractive vision correction of the eye; wherein the reshaping laser ablation is performed so that the reshaped surface portion substantially represents the refractive vision correction.

Item 28: The method of any one of items 24 to 27, wherein the reshaping laser ablation and the laser surface treatment are separated by at least a separation time interval during which no or substantially no ablation of the reshaped surface portion occurs; wherein the method further comprises determining, using a control system of the system, the separation time interval based on one or more parameters of the reshaping laser ablation and/or based on a class associated with the reshaping laser ablation.

Item 29: The method of any one of items 24 to 28, wherein a maximum surface temperature on the anterior surface during the laser surface treatment is lower than a maximum surface temperature on the anterior surface during the reshaping laser ablation.

DETAILED DESCRIPTION OF EXEMPLARY EMBODIMENTS

Figure 1:
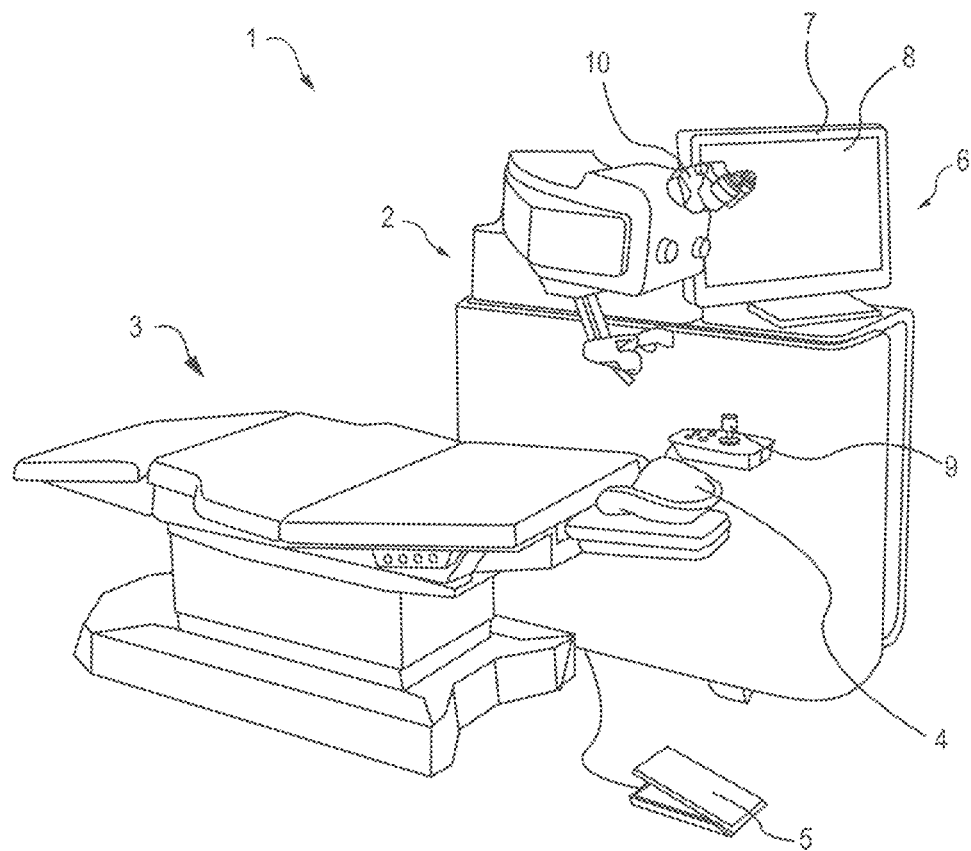
FIG. 1 schematically illustrates a system according to an exemplary embodiment for treating a cornea of a human eye.

FIG. 1 is a schematic illustration of a system 1 for treating a cornea of a human eye according to an exemplary embodiment. The system 1 includes a laser system and a laser-delivery optics that are mounted within a housing 2.

The laser system includes a laser and laser-delivery optics which direct the laser beam to the eye of a patient who is disposed on a patient support structure 3 having a headrest 4 on which the patient's head is supported. The laser system is an argon-fluorine (ArF) excimer laser, which generates pulses of laser light having a wavelength of approximately 193 nm.

It is to be noted that the present disclosure is not limited to such a laser and other pulsed or continuous laser systems are within the scope of the present disclosure. Specifically, the present disclosure may also be useful with other laser sources of ultraviolet and infrared radiation. The wavelength of the laser light may be chosen to controllably ablate the corneal tissue without causing significant damage to adjacent and/or underlying tissues of the eye. The laser system may emit light having a wavelength greater than 150 nm or greater than 190 nm. The wavelength may be less than 400 nm or less than 200 nm. The laser beam generated by the laser system may be a stationary laser beam or may be a scanning laser beam which is scanned across an anterior surface of the cornea of the eye.

The system 1 further includes a control system 6, which is configured to control the laser system for conducting the laser-based procedures as described in detail further below. The control system 6 includes a user interface, which is configured to allow the operator to conduct the laser-based procedures by interacting with the user interface. In the illustrated exemplary embodiment, the user interface includes but is not limited to: a touch-sensitive display 8 a of a display device 7, a control lever 9 and a food pedal 5. The system 1 further may include a surgical microscope 10, which is arranged to image an anterior surface of the patient's eye during the laser-based procedures.

Figure 2:
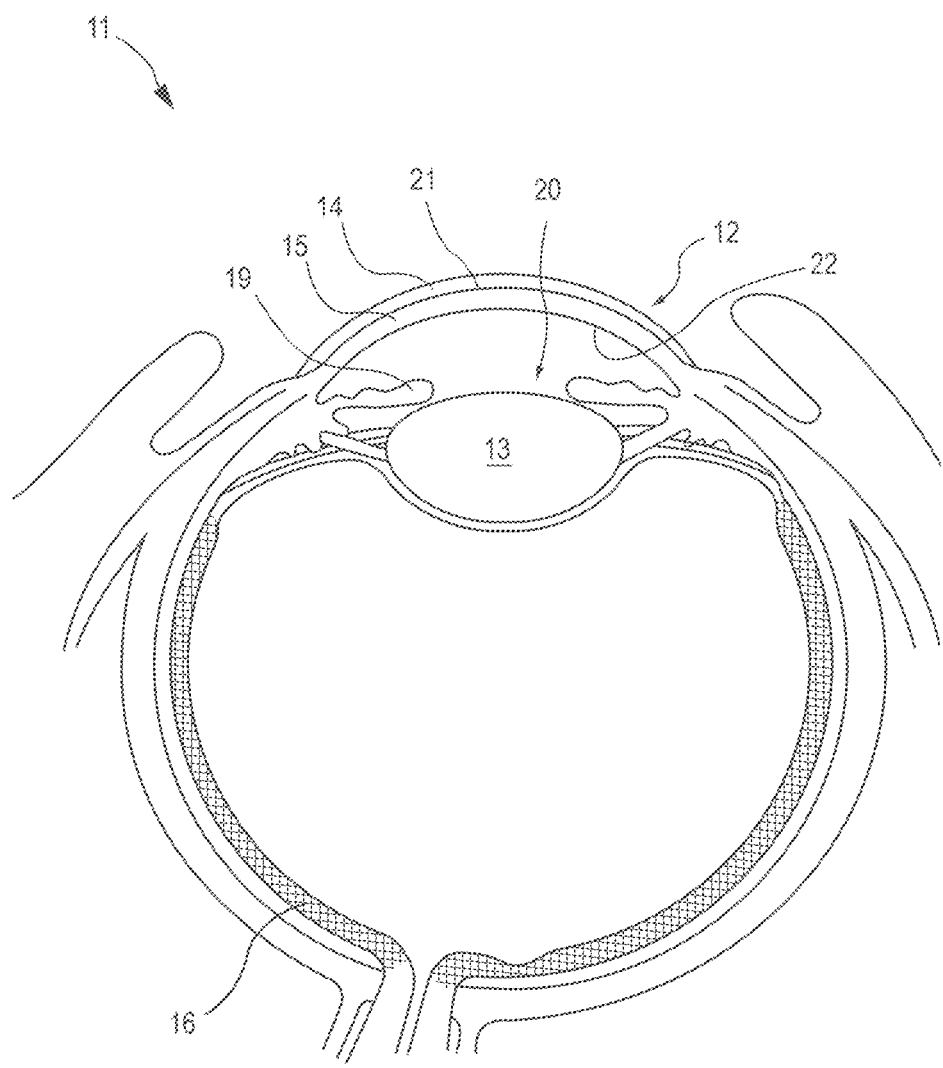
FIG. 2 is a cross-sectional schematic illustration of a human eye which is treated using the system according to the exemplary embodiment, which is shown in FIG. 1.

FIG. 2 is a cross-sectional schematic illustration of a human eye 11. The anterior portion of the eye 11 includes the crystalline lens 13, the cornea 12 and the iris 19. Light, which traverses the cornea 12 and passes through the pupil 20, which is formed by the iris 19, traverses the crystalline lens 13 and is then focused on the retina 16.

As is further schematically illustrated in FIG. 2, the cornea 12 includes layers of epithelium 14 and stroma 15 which are separated from each other by the Bowman's membrane 21. The cornea 12 further includes the Descemet's membrane and the endothelium layer, which are designated in FIG. 2 with common reference number 22.

As is explained with reference to FIGS. 3 to 4C, the system 1 of the exemplary embodiment is configured to perform a plurality of different laser ablation treatments to the eye, each of which involving ablation of a portion of the corneal stroma. These treatments include photorefractive keratectomy (PRK) on the human eye, laser-assisted sub-epithelial keratomileusis (LASEK), laser-assisted in-situ keratomileusis (LASIK) and phototherapeutic keratectomy (PTK).

However, the invention is not limited to systems, which provide this combination of treatments. It is conceivable that the system only provides a subset of these treatments, such as only a PRK treatment.

Figure 3:
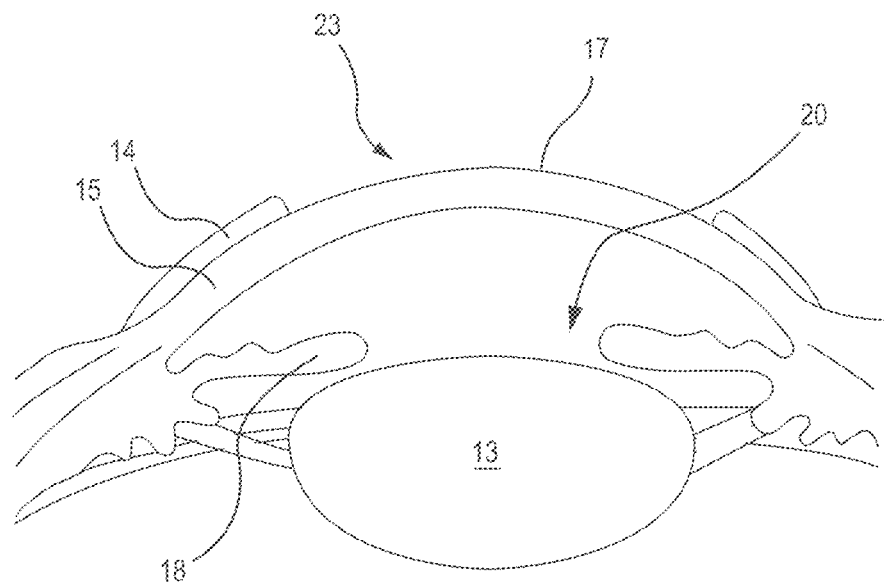
FIG. 3 is a schematic cross-sectional illustration of an anterior portion of the eye after removal of the epithelial layer.

As is illustrated in FIG. 3, in order to ablate a portion of the corneal stroma, a portion of the epithelium layer 14 is first removed to form an exposed anterior surface 17 of the stroma 15.

Any technique for removing a portion of the epithelium layer 14 is included within the scope of the present disclosure. Examples for such techniques are but are not limited to: (a) mechanical removal of a portion of the epithelium layer, e.g. by using a brush or a metallic scraper; (b) using ablative laser radiation (such as in transepithelial PRK); and (c) alcohol-assisted removal of a portion of the epithelium layer (such as in alcohol-assisted PRK, in which alcohol, such as ethyl alcohol is used to loosen or sever the connections that join the epithelium layer to the underlying Bowman's membrane). A further example is laser-assisted subepithelial keratomileusis (LASEK), in which a portion of the epithelium layer 14 is laid back and once the epithelial cells have been laid out of the way, the laser is applied to the exposed surface 17 of the stroma in the same fashion as in PRK. Still a further example is laser-assisted in-situ keratomileusis (LASIK), in which a thicker flap of corneal tissue, which includes a portion of the stroma, is cut using a microkeratome blade or a femtosecond laser.

Figure 4A:
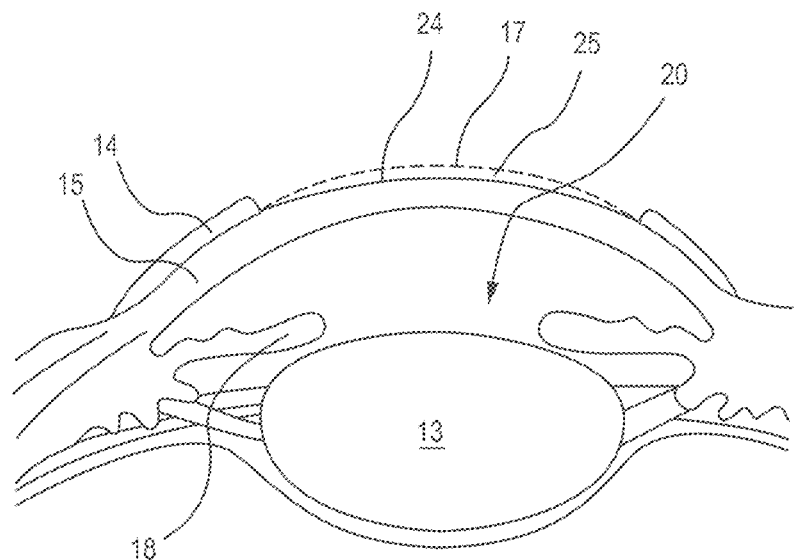
FIG. 4A is a schematic cross-sectional illustration of an anterior portion of the eye after a reshaping laser ablation has been carried out using the system according to the exemplary embodiment, which is shown in FIG. 1.

As is schematically illustrated in FIG. 4A, after exposing the stroma 15, the system 1 performs a reshaping laser ablation for reshaping the exposed anterior surface 17 of the stroma 15. In the example, which is shown in FIG. 4A, a portion 25 of the stoma 15 is ablated to form a reshaped surface portion 24, which represents a corrected surface portion and which has a spherical radius of curvature which is greater than the spherical radius of curvature of the anterior surface 17 of the unablated stroma 15. This example of a reshaping laser ablation reduces the refractive optical power of the cornea so that a myopic condition of the eye is corrected.

In a similar manner, it is possible to configure the reshaping laser ablation so that the corrected surface portion has a smaller spherical radius of curvature than the unablated stroma 15. This allows correction of hyperopia. In a similar manner, it is possible to correct astigmatism and/or higher order aberrations (i.e. aberrations that go beyond myopia, hyperopia and astigmatism). In this manner basically any desired shape change can be applied to the cornea.

The control system may be configured to read condition data which are indicative of one or more parameters of a patient's vision condition. Examples for condition data are but are not limited to: wavefront sensor data, corneal elevation data, a spherical correction, an astigmatic correction and an orientation of the axis of the astigmatic correction. The control system may further be configured to generate, based on the condition data, a pattern of laser pulses applied to the exposed stroma surface. The pattern of laser pulses may represent a time sequence of locations on the exposed stroma surface, wherein at each of the locations, a laser pulse is applied. In PTK processes, the pattern of laser pulses may be determined based on an operator-specified ablation depth.

The reshaping laser ablation is then carried out based on the determined pattern of laser pulses. It is also conceivable that the pattern of laser pulses is determined by a further data processing system which is in data communication with the control system.

However, laser ablations of the corneal stroma have post-treatment risks of poor wound healing. By way of example, laser ablation of corneal stroma may lead to corneal haze, which is a side-effect in which the cornea develops opaque white cells which cloud the vision to some extent. Corneal haze may cause glare from bright lights and a vague fogginess of vision. Furthermore, there are reports of patients suffering recurrent corneal erosions (RCE) after refractive laser surgery.

The present inventors, however, have acknowledged that post-treatment risks can be reduced if after the reshaping laser ablation, a non-corrective or substantially non-corrective laser surface treatment is performed.

Figure 4B:
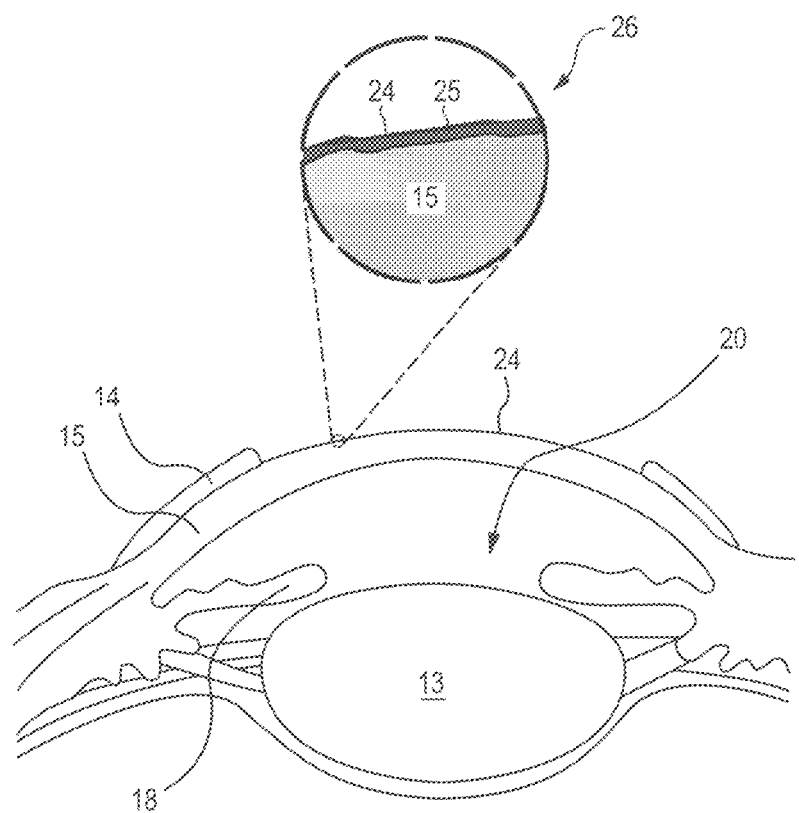
FIG. 4B is a schematic cross-sectional illustration of the anterior portion of the eye showing a pseudomembrane on a reshaped surface portion, wherein the pseudomembrane is formed by the reshaping laser ablation, which is illustrated in FIG. 4A.

As is schematically illustrated in FIG. 4B, based on transmission electron microscopic studies, the inventors have acknowledged that after the reshaping laser ablation treatment, the stroma 15 is covered by a substantially homogeneous pseudomembrane 25 (shown in the magnified inset 26 of FIG. 4B), which is composed of an electron-dense layer of material. The transmission electron microscopic studies also showed that the thickness of the pseudomembrane typically ranges between 100 nanometers and 1 micrometer.

Figure 4C:
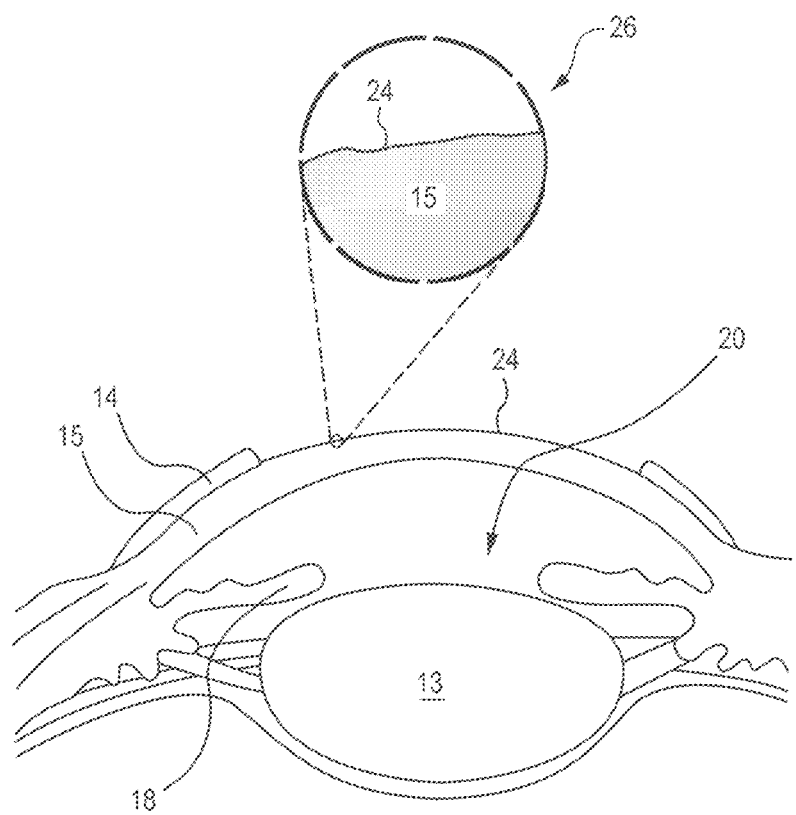
FIG. 4C is a schematic cross-sectional illustration of an anterior portion of the eye showing a reshaped surface portion, having the pseudomembrane removed by a laser surface treatment using the system according to the exemplary embodiment, which is shown in FIG. 1.

As is schematically illustrated in FIG. 4C, the inventors have also acknowledged that it is possible to treat the reshaped laser surface after the reshaping laser ablation in a manner so that the treatment results in a reshaped laser surface 24, which has a pseudomembrane having a reduced thickness or which has even no pseudomembrane at all. It is also possible that, as a result of the laser surface treatment, the resulting pseudomembrane has a discontinuous layer structure, which reduces its adverse effects on wound healing.

Specifically, the inventors have acknowledged that the pseudomembrane is at least partly caused by an increase in surface temperature on the exposed stromal surface during the reshaping laser ablation. It has also been found that a laser surface treatment, which produces only a minor temperature increase on the reshaped surface, facilitates generation of a reshaped surface on which the pseudomembrane has a small thickness and/or is discontinuous. The reshaped surface may even have no pseudomembrane at all.

Further, it has been found that post-treatment risks can particularly be reduced, if the maximum ablation depth of the laser surface treatment is less than 5 micrometers or less than 3 micrometers. A further reduction in post-treatment risks can be obtained, if the maximum ablation depth is less than 1.5 micrometers, or less than 1 micrometer.

A further advantageous effect is that the laser surface treatment—as a result of its small ablation depth—does not sacrifice too much of valuable stromal tissue. Further, a small ablation depth does not—or not significantly—affect the shape of the reshaped surface portion 24 so that the surface laser surface treatment can be applied on the reshaped surface portion 24 without altering the refractive properties provided by the reshaped surface portion 24. Moreover, due to the small ablation depth, the laser surface treatment can be performed in a short fraction of time.

It has further been found to be advantageous, if at each point on the reshaped surface portion 24, the ablation depth of the laser surface treatment is at least 0.05 micrometers, or at least 0.1 micrometers, or at least 0.2 micrometers, or at least 0.5 micrometers. The ablation depth of the laser surface treatment may be constant or substantially constant over the reshaped surface portion 24.

The inventors have also acknowledged that a larger diameter of the laser spot formed on the reshaped surface portion for performing the laser surface treatment leads to a smaller thickness of the pseudomembrane. Accordingly, at least during the laser surface treatment, the diameter of the laser spot may be greater than 0.5 millimeters or greater than 0.7 millimeters or greater than 1.5 millimeters, or greater than 2 millimeters, or greater than 3 millimeters. In order to perform the laser surface treatment, the system is configured to determine, based on one or more treatment parameters for the laser surface treatment, a pattern of laser pulses which are applied to the reshaped surface portion during the laser surface treatment.

The inventors have acknowledged that it is possible to reduce the surface temperature during the laser surface treatment (and, hence, to reduce the thickness or prevent the appearance of the pseudomembrane after the laser surface treatment), by adjusting the pattern of laser pulses.

Figure 4D:
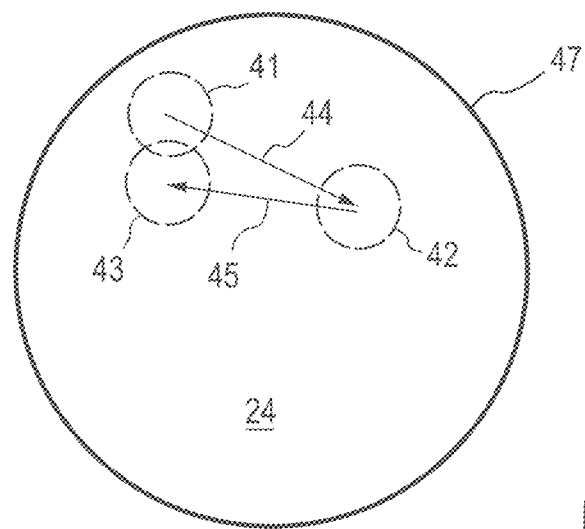
FIGS. 4D and 4E are schematic illustrations of exemplary scanning processes during a laser surface treatment of the reshaped surface portion, performed by the system according to the exemplary embodiment, which is shown in FIG. 1.

Some aspects of this finding of the inventors are explained in detail with reference to FIGS. 4D and 4E. FIG. 4D schematically illustrates the scanning process for scanning the laser beam during the laser surface treatment across the reshaped surface portion 24, which has a circular outer boundary 47. In the illustrated example, the laser beam is a pulsed laser beam. Between each pair of time-consecutive spots, the axis of the laser beam is moved to a different location so that the spots are applied at different locations on the reshaped surface portion 24. Therefore, the laser surface treatment can be represented as a pattern of laser pulses, which generate a plurality of laser pulse spots, which are distributed over the reshaped surface portion 24.

For the sake of simplicity, in FIG. 4D, only three spots 41, 42 and 43 of the pattern of laser pulses are illustrated. Each of the spots 41, 42 and 43 represents a laser pulse, which is applied to the reshaped surface portion 24. The spots 41 and 42 represents a first pair of time-consecutive laser pulses and the movement of the beam axis between the spots 41 and 42 is schematically illustrated by arrow 44. The spots 42 and 43 present a second pair of time-consecutive laser pulses, wherein the movement of the beam axis between the spots 42 and 43 is schematically illustrated by arrow 45.

It has been shown by the inventors that the surface temperature on the reshaped surface portion 24 during the laser surface treatment can be efficiently reduced if the laser treatment is performed so that substantially each pair, of time-consecutive laser pulses (such as the first pair represented by spots 41 and 42 and the second pair, represented by spots 42 and 43) are substantially spatially non-overlapping. This can be seen from FIG. 4D, where the spots 41 and 42 are spatially non-overlapping on the reshaped surface portion 24 and the spots 42 and 43 are also spatially non-overlapping. An overlap only occurs between spots 41 and 43, which do not represent a pair of time-consecutive laser pulses.

As can further be seen from FIG. 4D, the surface portion, which corresponds to the first spot 41 can cool down until a portion thereof is again heated by the spot 43. This allows performing a laser surface treatment of the reshaped surface portion 24 at a comparatively low surface temperature.

Figure 4E:
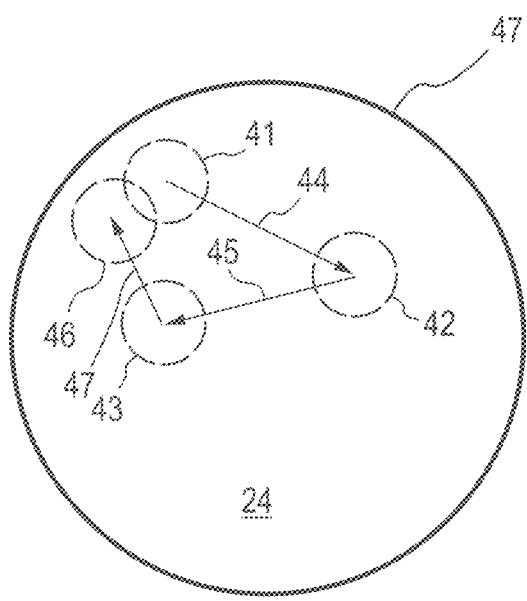

FIG. 4E schematically illustrates an embodiment, of a scanning process, which is even more efficient in reducing the surface temperature on the reshaped surface portion 24 during the laser surface treatment. As can be seen from FIG. 4E, not only each pair of time-consecutive laser pulses is spatially non-overlapping, but each group of three time-consecutive laser pulses is spatially non-overlapping.

In FIG. 4E, the laser spots 41, 42 and 43 represent a first group of three time-consecutive laser pulses and the spots 42, 43 and 46 represent a second group of three time-consecutive laser pulses. The movement of the beam axis of the laser beam between each pair of time-consecutive pulses is schematically illustrated by arrows 44, 45 and 47. As can be seen from FIG. 4E, compared to the embodiment, which is shown in FIG. 4D, the surface portion represented by laser spot 41 has even more time to cool down until a portion thereof is heated again by the laser pulse represented by laser spot 46. Therefore, in the exemplary embodiment, which is shown in FIG. 4E, within each group of three time-consecutive pulses, there is no pair of laser pulses, which significantly spatially overlaps. Increasing the required number of pulses in a group of time-consecutive pulses to even higher values such as 4, 5, 6, 8, 10, 12, 16 or 20, will lead to a further reduction in surface temperature during the laser surface treatment. Since the laser surface treatment is non-corrective, this facilitates using higher values for the group of time-consecutive pulses, since the laser spot density on the reshaped surface portion is not concentrated in portions of the reshaped surface portion but rather homogeneously distributed.

It has further been shown to be advantageous if the laser surface treatment is performed so that substantially each point on the reshaped surface portion 24 is treated by at most 10 pulses of the laser scanning laser beam, or at most 5 pulses, or at most 3 pulses or at most 2 pulses. Measurements of the surface temperature of the ablated surface of the cornea during laser treatments have shown that a low number of pulses lead to lower surfaced temperatures during the laser surface treatment process. The low number of ablation pulses also allows the laser surface treatment to be carried out within a comparatively short processing time.

The above laser pulse pattern can, for example, be implemented using scanning optics, which scan a beam axis of the laser beam over the reshaped surface portion. The scanning optics may be configured to move a beam axis of the laser beam between two time-consecutive pulses. The pulse pattern may be represented by a distribution of spots on the the surface of the cornea. Each spot may be formed by one of the laser pulses. The pulse pattern may therefore be described as a spot density distribution over the anterior surface of the cornea. Specifically, the scanning optics may be configured to move the beam axis of the laser beam in an irregular pattern over the reshaped surface portion in order to provide the desired degree of pulse separation.

The control system may further be configured so that during the laser surface treatment, the pulse repetition rate of the pulsed laser beam is less than a pulse repetition rate during the reshaping laser ablation. Additionally or alternatively, a pulse duration of the pulsed laser beam during the laser surface treatment may be less than a pulse duration during the reshaping laser ablation. Additionally or alternatively, a pulse peak power of the pulsed laser beam during the laser surface treatment may be less than a pulse peak power during the reshaping laser ablation. It has been shown by the inventors that through one or more of these measures, the surface temperature during the laser surface treatment can be even more efficiently reduced.

The inventors have further found that an even more efficient removal of the pseudomembrane or an even more efficient reduction of the thickness of the pseudomembrane can be achieved if the control system is configured so that one or more parameters of the laser surface treatment are determined based on one or more parameters of the reshaping laser ablation and/or one or more parameters of the reshaped surface portion.

Examples for the parameters of the reshaping laser ablation are but are not limited to: a parameter of a laser beam, a parameter of a scanning pattern, and an ablation depth. Examples for the one or more parameters of a shape of the reshaped surface portion are but are not limited to: the spherical correction (measured units of reciprocal focal length) and/or the astigmatic correction (measured in units of reciprocal focal length).

It has been shown that it is possible to make, based on properties of the reshaping laser ablation and/or properties of the reshaped surface portion, a reliable estimate about the thickness of the pseudomembrane. This, in turn, allows optimization of the laser surface treatment so that the surface temperature during the laser surface treatment is at a low level.

By way of example, the control system may be configured to adapt the scanning pattern, and/or one or more parameters of the laser beam for performing the laser surface treatment so that the ablation depth of the laser surface treatment is adapted to the estimated thickness of the pseudomembrane. This also avoids unnecessary ablation of stromal tissue.

The control system may be configured to use a lookup table to determine the one or more parameters of the laser surface treatment. The lookup table may be stored in a data storage system of the control system.

Figure 5:
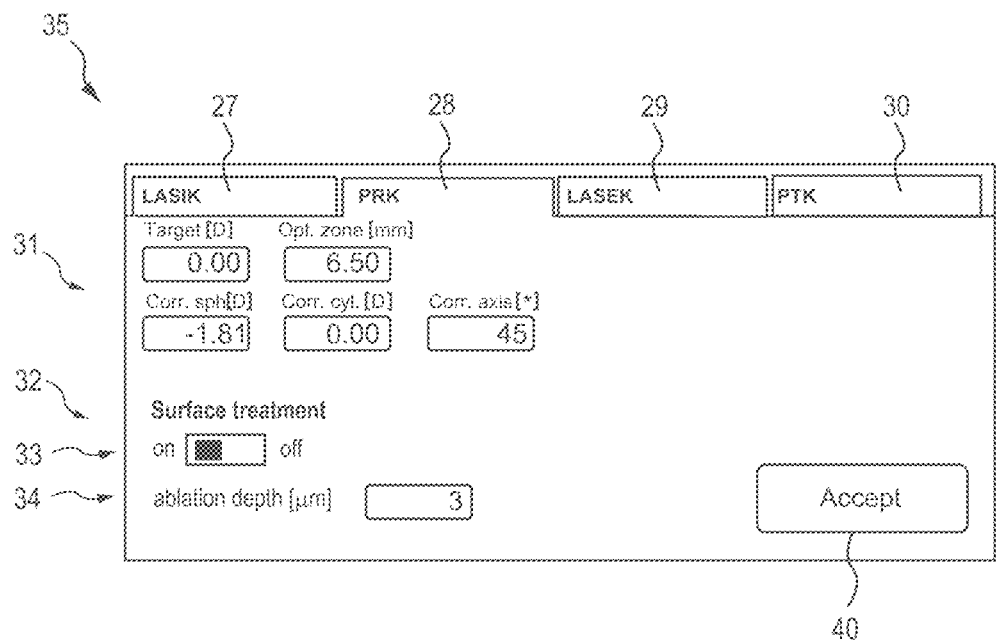
FIG. 5 is a schematic illustration of a window of a graphical user interface, which is implemented on a control system of the system according to the exemplary embodiment, which is shown in FIG. 1.

FIG. 5 is a schematic illustration of a window 35 of a graphical user interface of the control system. The window 35 presents to the operator treatment options for different laser ablation treatments. These treatment options include a phototherapeutic keratectomy (PRK) treatment, a laser-assisted subepithelial keratomileusis (LASEK) treatment, a laser-assisted in-situ keratomileusis (LASIK) treatment, and a phototherapeutic keratectomy (PTK) treatment. Each of these treatment options is selectable by activating, using the touch sensitive display, one of the tabs 27 to 30. Each of these treatment options provide a combined treatment of a reshaping laser ablation and an optically non-corrective surface laser treatment.

As is further schematically shown in FIG. 5, upon selection of the tab 28, the graphical user interface may present to the operator a plurality of input fields 31 for entering treatment input for configuring the reshaping laser ablation which generates the reshaped surface portion representing the required vision correction. Specifically, as can be seen from FIG. 5, in this exemplary PRK treatment, the treatment input includes values for a target spherical optical power (measured in units of reciprocal focal length), a spherical correction (denoted in FIG. 5 as "Corr. sph" and measured in units of reciprocal focal length), an astigmatic correction (denoted in FIG. 5 as "Corr cyl." and measured in units of reciprocal focal length), the orientation of the axis of the astigmatic correction (denoted in FIG. 5 as "Corr. axis" and measured in units of radians or degrees) and a diameter of the optical zone (measured in units of length, such as millimeters).

Based on these parameters (or the parameters for the respective desired treatment which is selected via a one of the tabs 27 to 30), the control system determines the pattern of laser pulses for the reshaping laser ablation. Additionally, the control system may be configured to determine the pattern of laser pulses further based on data, which are generated e.g. using an aberrometer and/or based on corneal elevation data.

As can further be seen from FIG. 5, the window 35 also presents to the operator input fields 32 for entering treatment input for performing the laser surface treatment. The input fields 32 include a button 33 for activating and deactivating the laser surface treatment. This allows the operator to selectively perform a PRK process with or without conducting the laser surface treatment. Furthermore, the window 35 also includes an input field 34 for entering an ablation depth of the laser surface treatment.

The laser surface treatment of the PRK process is configured so that the ablation depth is substantially constant over the reshaped surface portion. However, it is also conceivable that the system is configured to perform the laser surface treatment so that the ablation depth varies over the reshaped surface portion. After the operator has entered 102 (shown in FIG. 7 as a box representing a step) the user input. The operator presses an accept button 40 for submitting the user input to the control system.

After receiving the user input related to the PRK process (i.e. the treatment input for the reshaping laser ablation and the treatment input for the laser surface treatment), the control system controls, based on the user input, the laser system for performing the reshaping laser ablation and the laser surface treatment.

As such, it is not necessary for the operator to input, after completion of the reshaping laser ablation, further treatment input for configuring the laser surface treatment. Therefore, the combined treatment option for the PRK treatment (which includes the treatment input for the reshaping laser ablation as well as for the laser surface treatment) provides an improved workflow for the operator and shorter treatment times for the patient as compared to performing the same procedure in two separate steps.

Figure 6:
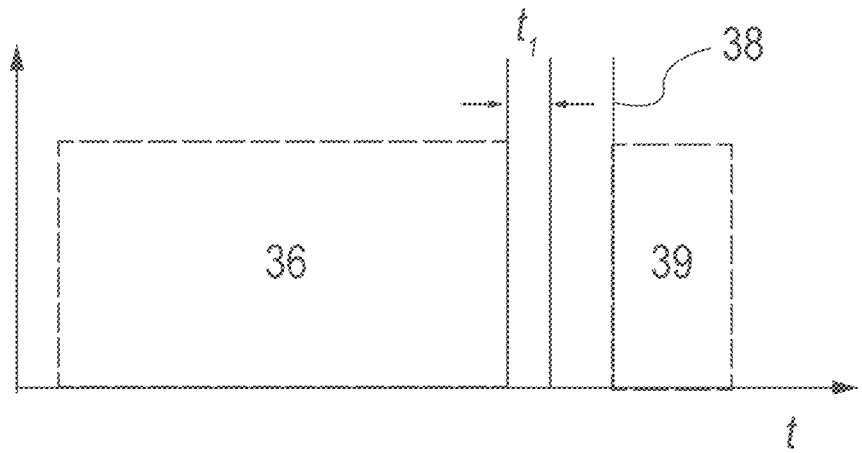
FIG. 6 is a timing diagram illustrating a separation time interval, which separates the reshaping laser ablation and the laser surface treatment.

FIG. 6 schematically illustrates a timing diagram of the laser-based treatments, which are carried out with the system according to the exemplary embodiment after the exposed stroma surface has been generated. In the timing diagram, block 36 schematically illustrates the operation of the laser system during the reshaping laser ablation. After completion of the reshaping laser ablation, there is a separation time interval $t_1$, which separates the reshaping laser ablation process and the laser surface treatment process. In the timing diagram of FIG. 6, the laser surface treatment process is schematically illustrated as block 39. During the separation time interval, the reshaped surface portion 24 (shown in FIGS. 4A to 4C) is not ablated by a laser beam. This allows the reshaped surface portion 24 to cool down so that the succeeding laser surface treatment can be carried out at low surface temperatures. The separation time interval $t_1$ is at least 0.1 seconds, or at least 0.2 seconds, or at least 0.5 seconds, or at least 1 second, or at least 1.5 seconds.

The separation time interval $t_1$ may be preset for all laser treatments performed by the system. In an alternative embodiment, the separation time interval $t_1$ is determined by the control system. By way of example, the control system may be configured so that the separation time interval $t_1$ is determined based on one or more parameters of the reshaping laser ablation and/or based on a class associated with the reshaping laser ablation.

Specifically, the system may be configured to set different values for the separation time interval $t_1$ depending on a value of an ablation depth (such as the maximum ablation depth of the reshaping laser ablation) and/or depending on a size parameter of the optical zone (such as a diameter of the optical zone). Additionally or alternatively, the system may be configured to set different values for the separation time interval $t_1$ depending on whether the reshaping laser ablation is configured to correct for a myopic, myopic/astigmatic, hyperopic, hyperopic/astigmatic, or mixed astigmatic visual condition of the eye, which represent classes of refractive corrections. By way of example, the inventors have found that reshaping laser ablations for spherical myopia corrections concentrate laser pulses in a central region of the cornea, whereas reshaping laser ablations for spherical hyperopia corrections concentrate laser pulses in a peripheral ring-shaped zone. Therefore, reshaping laser ablations for correcting spherical myopia tend to generate a higher maximum temperature on the ablated surface of the cornea. Accordingly, if the class, which is assigned to a reshaping laser ablation is the class "spherical myopic correction", the control system determines a comparatively long separation time interval $t_1$. On the other hand, if the class, which is assigned to a reshaping laser ablation is the class "spherical hyperopic correction", the control system determines a separation time interval $t_1$, which is shorter than the separation interval $t_1$ for myopic corrections.

Further by way of example, the system may be configured to set different values for the separation time interval depending on a power of the spherical and/or astigmatic refractive correction (measured in diopters) provided by the reshaping laser ablation. The power represents a parameter of the reshaping laser ablation.

The control system may further be configured to leave the separation time open to the operator and to start the laser surface treatment 39 not earlier than the time of receipt of start command user input 38 e.g. via a foot pedal 5 (shown in FIG. 1) of the control system. Additionally it may be configured such that if the start command user input 38 is received before the expiration of the separation time interval $t_1$, the system starts the laser surface treatment not before the separation time interval has expired. The requirement to give a start signal makes the operator aware that the system starts the laser surface treatment. Therefore, the requirement to press the foot pedal 5 provides an increased safety level. Alternatively, it is also conceivable that the control system automatically starts the laser surface treatment after expiration of the separation time interval $t_1$, i.e. without waiting for the receipt of the start signal.

It has been shown by the inventors that the separation time interval $t_1$ reduces the surface temperature of the exposed stroma before the laser surface treatment is started, which facilitates generation of a reshaped surface portion, which has a thin pseudomembrane, a discontinuous pseudomembrane, or even no pseudomembrane at all.

Figure 7:
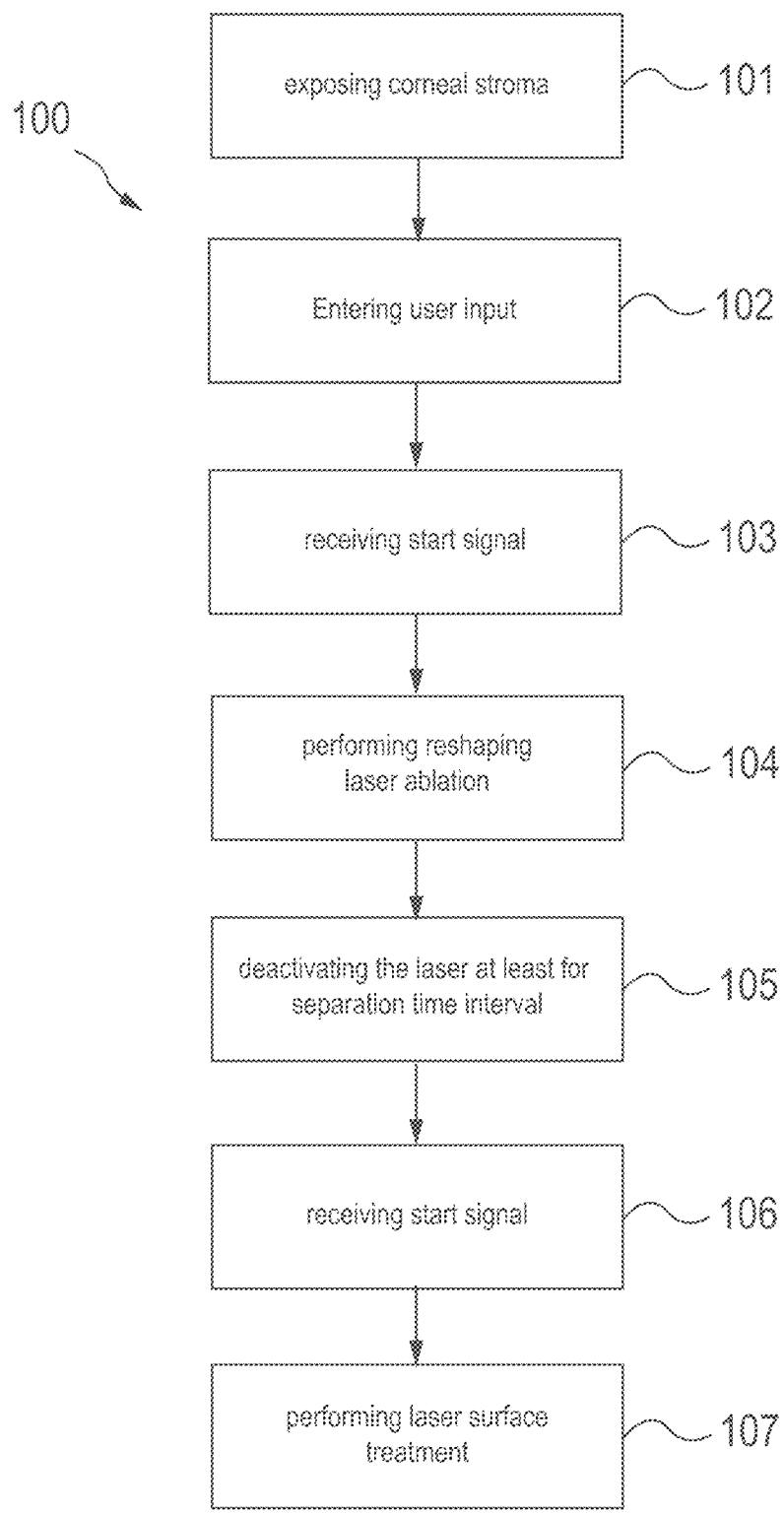
FIG. 7 is a flow chart, illustrating an exemplary method for treating a cornea of the human eye using the system according to the exemplary embodiment, which is shown in FIG. 1.

FIG. 7 is a flowchart illustrating the laser treatment processes, which are performed using the exemplary system, which is shown in FIG. 1.

The eye is treated to expose 101 the corneal stroma. Examples for such treatments are but are not limited to: complete removal of the epithelial layer (such as in PRK processes), forming a flap, which includes the epithelial layer and which can be pushed back for exposing the stroma and can later be placed back on to its original position. The flap may consist of a portion of the epithelium layer (such as in LASEK processes) or may additionally include a portion of the stroma (such as in LASIK processes).

The user uses the graphical user interface of the control system to enter 102 user input, which includes treatment input for performing the reshaping laser ablation and treatment input for performing the laser surface treatment, as has been explained in detail with reference to FIG. 5. One or both treatment inputs may include one or more values of treatment parameters for performing the respective treatment. Additionally or alternatively, the treatment input for performing the laser surface treatment may include a command for activating or deactivating the laser surface treatment.

After the user has entered 102 the user input. The operator presses an accept button for submitting the user input to the control system. The control system is configured to calculate, based on the user input, a pattern of laser pulses for performing the reshaping laser ablation and a pattern of laser pulses for performing the laser surface treatment.

The system then indicates to the operator (e.g. by using an acoustic signal) that the system is ready for starting the reshaping laser ablation. The operator then presses the foot pedal 5 (shown in FIG. 1) for generating a start signal.

Upon receiving 103 the start signal, the control system performs 104 the reshaping laser ablation for ablating a portion of the stroma and thereby generating a reshaped surface portion 24 (shown in FIG. 4). The reshaped surface portion may provide a corrected surface portion for providing a refractive correction. Alternatively, the reshaped surface portion may represent an optically uncorrected surface, which may have been treated for surface diseases using the reshaping laser ablation.

After the reshaped surface portion has been formed, the control system deactivates 105 the laser at least for a separation time interval $t_1$ (shown in FIG. 6), which is a minimum time interval between the reshaping laser ablation and the succeeding laser surface treatment in which no laser radiation is applied to the exposed stroma of the eye. The separation time interval $t_1$ is at least 0.1 seconds, or at least 0.2 seconds, or at least 0.5 seconds, or at least 1 second, or at least 1.5 seconds. The separation time interval $t_1$ may be preset or determined by the control system, as has been explained above with reference to FIG. 6.

During or after the separation time interval $t_1$, the operator presses a foot pedal 5 (shown in FIG. 1) for generating a start signal for continuing the treatment by performing the laser surface treatment. Upon receiving 106 the start signal, the control system performs the laser surface treatment, wherein the laser is not activated before expiration of the separation time interval $t_1$. The separation time interval $t_1$ causes the surface temperature of the exposed corneal stroma surface to decrease, which facilitates performing the laser surface treatment so that after the treatment, the thickness of the pseudomembrane is reduced, the pseudomembrane is discontinuous, or even no pseudomembrane is present.

It is also conceivable that the same or similar laser surface treatment processes, as described above, are used in treatments, such as SMILE and FLEx, for treating an exposed surface of the stroma after the lenticule has been removed.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In the claims, the word "comprising" does not exclude other elements or steps, and the indefinite article "a" or "an" does not exclude a plurality. Any reference signs in the claims should not be construed as limiting the scope.

What is claimed is:

1. A system for treating a cornea of a human eye using laser radiation, the system comprising:
   a laser system; and
   a control system, which is configured to control the laser system for performing
      a) a reshaping laser ablation for ablating a portion of a stroma of the cornea; and
      b) a laser surface treatment;
   wherein the laser surface treatment is an optically non-corrective treatment of a reshaped surface portion;

wherein the reshaped surface portion represents a corrective or non-corrective reshaping of an exposed surface of the stroma and is formed using the reshaping laser ablation;

wherein a maximum ablation depth of the laser surface treatment is less than 5 micrometers;

wherein the control system comprises a user interface which is configured to receive user input, which comprises treatment input for performing the reshaping laser ablation and treatment input for performing the laser surface treatment;

wherein the control system is configured to control, after receiving the user input and based on the user input, the laser system for performing the reshaping laser ablation and the laser surface treatment.

2. The system of claim 1, wherein the maximum ablation depth of the laser surface treatment is less than 1.5 micrometers.

3. The system of claim 1, wherein:
the laser surface treatment is performed using a pulsed laser beam generated by the laser system; and
the laser surface treatment is performed so that each point on the reshaped surface portion is treated by at most 10 pulses of the laser beam.

4. The system of claim 3, wherein the laser surface treatment is performed so that each point on the reshaped surface portion is treated by at most 3 pulses of the laser beam.

5. The system of claim 1, wherein:
the laser surface treatment is performed using a pulsed laser beam generated by the laser system; and
the laser surface treatment is performed so that each pair of time-consecutive laser pulses of the laser beam, which are applied to the reshaped surface portion, are spatially non-overlapping.

6. The system of claim 1, wherein control system is configured so that the reshaping laser ablation and the laser surface treatment are separated by at least a separation time interval;
wherein the system is configured so that during the separation time interval, no ablation of the reshaped surface portion occurs;
wherein the separation time interval is at least 0.1 seconds.

7. The system of claim 6, wherein the separation time interval is at least 0.5 seconds.

8. The system of claim 6, wherein the control system is configured to determine the separation time interval based on one or more parameters of the reshaping laser ablation and/or a based on a class associated with the reshaping laser ablation.

9. The system of claim 6, wherein the control system is configured to receive, at least after completion of the reshaping laser ablation, start command user input for starting the laser surface treatment;
wherein the control system is configured not to start the laser surface treatment until the start command user input is received and until the separation time interval has lapsed.

10. The system of claim 1, wherein for each point on the reshaped surface portion, the ablation depth of the laser surface treatment is at least 0.05 micrometers.

11. The system of claim 1, wherein the reshaped surface portion represents the corrective reshaping of the exposed surface of the cornea, wherein the control system is configured to:

receive or generate data which are indicative of one or more parameters of a refractive vision correction of the eye;
wherein the reshaping laser ablation is configured so that the reshaped surface portion represents the refractive vision correction.

12. The system of claim 1, wherein the treatment input for performing the laser surface treatment comprises:
a value of an ablation depth of the laser surface treatment; and/or
a command for activating or deactivating the laser surface treatment.

13. The system of claim 1, wherein the control system is configured to determine one or more parameters of the laser surface treatment based on one or more parameters of the reshaping laser ablation and/or one or more parameters of the reshaped surface portion.

14. The system according to claim 1, wherein for at least at one position on the reshaped surface, a stromal ablation depth of the reshaping laser ablation is greater than 5 micrometers.

15. The system of claim 1, wherein: the laser surface treatment is performed using a pulsed laser beam generated by the laser system; and each group of 3 time-consecutive pulses of the pulsed laser beam, which are applied to the reshaped surface portion for performing the laser surface treatment, are spatially non-overlapping.

16. The system according to claim 1, wherein a pulse repetition rate of a pulsed laser beam generated by the laser system during the laser surface treatment is less than a pulse repetition rate of a pulsed laser beam generated by the laser system during the reshaping laser ablation.

17. The system according to claim 1, wherein a pulse duration of a pulsed laser beam generated by the laser system during the laser surface treatment is less than a pulse duration of a pulsed laser beam generated by the laser system during the reshaping laser ablation.

18. The system according to claim 1, wherein a pulse peak power of a pulsed laser beam generated by the laser system during the laser surface treatment is less than a pulse peak power of a pulsed laser beam generated by the laser system during the reshaping laser ablation.

19. The system of claim 1, wherein a maximum surface temperature on the anterior surface during the laser surface treatment is lower than a maximum surface temperature on the anterior surface during the reshaping laser ablation.

20. A method for treating a cornea of a human eye using a system comprising: a laser system; a control system which is configured to control the laser system for performing (a) a reshaping laser ablation for ablating a portion of a stroma of the cornea, and (b) a laser surface treatment; wherein the laser surface treatment is an optically non-corrective treatment of a reshaped surface portion; wherein the reshaped surface portion represents a corrective or non-corrective reshaping of an exposed surface of the stroma and is formed using the reshaping laser ablation; wherein the method comprises:

receiving, using a user interface of the control system, user input, which comprises treatment input for performing the reshaping laser ablation and treatment input for performing the laser surface treatment;

controlling, by the controller, based on the user input, the laser system for performing the reshaping laser ablation and the laser surface treatment;

wherein a maximum ablation depth of the laser surface treatment is less than 5 micrometers.

* * * * *